United States Patent
Yoo et al.

(10) Patent No.: US 11,606,149 B2
(45) Date of Patent: Mar. 14, 2023

(54) OPTICAL TRANSMITTER BASED ON OPTICAL TIME DIVISION MULTIPLEXING

(71) Applicant: ELECTRONICS AND TELECOMMUNICATIONS RESEARCH INSTITUTE, Daejeon (KR)

(72) Inventors: Sanghwa Yoo, Daejeon (KR); Joon Young Huh, Daejeon (KR); Sae-Kyoung Kang, Daejeon (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/545,075

(22) Filed: Dec. 8, 2021

(65) Prior Publication Data

US 2022/0360339 A1 Nov. 10, 2022

(30) Foreign Application Priority Data

May 4, 2021 (KR) .................. 10-2021-0058076
Sep. 27, 2021 (KR) .................. 10-2021-0126955

(51) Int. Cl.
| | | |
|---|---|---|
| H04B 10/564 | (2013.01) | |
| H04B 10/54 | (2013.01) | |
| H04J 14/08 | (2006.01) | |
| H04L 7/00 | (2006.01) | |

(52) U.S. Cl.
CPC ......... *H04B 10/564* (2013.01); *H04B 10/541* (2013.01); *H04J 14/08* (2013.01); *H04L 7/0091* (2013.01)

(58) Field of Classification Search
CPC ..... H04B 10/564; H04B 10/541; H04J 14/08; H04L 7/0091
See application file for complete search history.

(56) References Cited

U.S. PATENT DOCUMENTS

| | | | |
|---|---|---|---|
| 7,065,300 B1 * | 6/2006 | Walker | H01S 5/18311 359/344 |
| 7,792,429 B2 | 9/2010 | Park et al. | |
| 8,249,459 B2 | 8/2012 | Iwamura et al. | |
| 9,874,688 B2 | 1/2018 | Doerr et al. | |

(Continued)

FOREIGN PATENT DOCUMENTS

| | | | | |
|---|---|---|---|---|
| EP | 2317671 A1 * | 5/2011 | ......... | H04B 10/2569 |
| EP | 3955478 A1 * | 2/2022 | ............. | G02B 6/425 |

(Continued)

OTHER PUBLICATIONS

Hans-Georg Weber et al., "Ultrahigh-Speed OTDM-Transmission Technology", Journal of Lightwave Technology, vol. 24, No. 12, Dec. 2006.

*Primary Examiner* — Abbas H Alagheband
(74) *Attorney, Agent, or Firm* — LRK Patent Law Firm (57) ABSTRACT

An optical transmitter based on optical time division multiplexing is disclosed, which may solve the issues of complex structure and operation of a multilevel-OTDM-based optical transmitter while using a multilevel signal modulation format and OTDM technology that may increase the transmission rate of an optical transmitter with limited bandwidth.

7 Claims, 12 Drawing Sheets

(56) References Cited

U.S. PATENT DOCUMENTS

| | | | |
|---|---|---|---|
| 2003/0058504 A1* | 3/2003 | Cho | H04J 14/08 |
| | | | 398/147 |
| 2003/0095736 A1* | 5/2003 | Kish, Jr. | H01S 5/02415 |
| | | | 385/37 |
| 2003/0133641 A1* | 7/2003 | Yoo | G02B 6/12004 |
| | | | 385/14 |
| 2004/0208414 A1* | 10/2004 | Lee | H04J 14/08 |
| | | | 385/24 |
| 2004/0208555 A1* | 10/2004 | Pau | H04Q 11/0005 |
| | | | 398/56 |
| 2010/0215373 A1* | 8/2010 | Iwamura | H04J 14/08 |
| | | | 398/98 |
| 2010/0316377 A1* | 12/2010 | Scaffardi | H04J 14/06 |
| | | | 398/52 |
| 2015/0055956 A1 | 2/2015 | Lee et al. | |
| 2015/0270907 A1* | 9/2015 | Tanaka | H04B 10/564 |
| | | | 398/197 |
| 2021/0257729 A1* | 8/2021 | Murakowski | H01Q 25/008 |
| 2022/0158752 A1* | 5/2022 | Duthel | H04B 10/508 |

FOREIGN PATENT DOCUMENTS

| | | | | |
|---|---|---|---|---|
| JP | 3752540 B2 * | 3/2006 | | H04J 14/08 |
| JP | 6572659 B2 | 9/2019 | | |
| WO | WO-2007036989 A1 * | 4/2007 | | H04B 10/25133 |

\* cited by examiner

OPTICAL TRANSMITTER BASED ON OPTICAL TIME DIVISION MULTIPLEXING

CROSS-REFERENCE TO RELATED APPLICATIONS

This application claims priority to Korean Patent Application No. 10-2021-0058076 filed on May 4, 2021, and Korean Patent Application No. 10-2021-0126955 filed on Sep. 27, 2021, in the Korean Intellectual Property Office, the entire disclosures of which are incorporated herein by reference for all purposes.

BACKGROUND

1. Field of the Invention

The present disclosure relates to an optical transmitter based on optical time division multiplexing (OTDM). More specifically, the present disclosure relates to a structure and a method that may solve the issues of complex structure and operation of a multilevel-OTDM-based optical transmitter while using a multilevel signal modulation format and OTDM technology that may increase the transmission rate of an optical transmitter with limited bandwidth.

2. Description of Related Art

As the bandwidth required for Data Center Interconnect (DCI) has exploded, the data rate to be provided by optical interconnection modules has increased from 100 gigabits per second (Gb/s) in the past to 400 Gb/s. The IEEE 400GBASE standard proposes an 8-channel×26-gigabaud (GBd) or 4-channel×53-GBd transmission method based on a 4-channel multilevel modulation/demodulation (pulse amplitude modulation (PAM)) signal to achieve 400 Gb/s DCI.

However, in order to accommodate the continuously increasing bandwidth, next-generation DCI should provide a transmission rate of 800 Gb/s or 1.6 Tb/s. Wavelength division multiplexing (WDM) technology, which is mainly used in optical transceivers, has a limit in increasing the transmission capacity by increasing the number of channels due to the issues of wavelength management, maintenance, and production cost. Usually, the number of channels is limited to a maximum of about 8, and at this time, a transmission rate of 200 Gb/s per wavelength should be guaranteed for 1.6 Tb/s DCI.

Also, in the case of parallel single-mode (PSM) fiber multiplexing) technology, about 8 is considered as the maximum number of channels because the economic cost burden increases as the number of channels increases, and a transmission rate of 200 Gb/s per channel is required as in the case of the WDM technology.

For this purpose, a 200 Gb/s PAM-4 optical device should be able to operate at 100 GBd. While the Baud-Rate decreases as the PAM level is increased from level 4 to level 8, there is an issue in that the required signal-to-noise ratio (SNR) increases. Further, although the high spectral efficiency coherent optical transmission method used for long-distance transmission beyond metro may alleviate the SNR issue while reducing the baud rate, it is difficult to introduce it to DCI due to high power, form factor, and cost.

In addition, there is a photodetector based on a germanium material as a photoreceiving device capable of operating with a 200 Gb/s PAM-4 signal. The germanium material-based photodetector may theoretically have a 3 dB bandwidth of 80 GHz or more, and recently, an 80 GHz bandwidth achieved by using Inductive Peaking technology has been reported experimentally. Further, since the germanium material-based photodetector may be implemented on a silicon photonics platform, it has high commercialization potential.

However, it is difficult to find an appropriate solution that provides a bandwidth of 70 GHz or higher for an optical modulator, which is an optical transmission device, for 100-GBd operation. High bandwidth may be achieved using a III-V-based optical modulator, but there are issues in cost and incompatibility with the CMOS process, making it difficult to commercialize. In addition, a silicon photonics-based optical modulator compatible with the CMOS process also has an issue in that it may not achieve a bandwidth of 70 GHz or more due to low photoelectric conversion efficiency compared to the III-V medium.

SUMMARY

Example embodiments provide a structure of an optical transmitter and a method that may solve the issues of the complex structure and operation of a multilevel-optical time division multiplexing (OTDM)-based optical transmitter while using a multilevel signal modulation format and the OTDM technology that may increase the transmission rate of an optical transmitter with limited bandwidth.

More specifically, example embodiments provide a structure of an optical transmitter and a method that solve the issue of time synchronization between an optical signal and an electrical signal occurring in the multilevel-OTDM-based optical transmitter by using a bit error rate (BER) for a part of an OTDM signal.

In addition, example embodiments provide a structure of an optical transmitter and a method that solve the issue of non-uniform optical power between channels of the OTDM signal occurring in the multilevel-OTDM-based optical transmitter by using a BER for a part of an OTDM signal.

According to an aspect, there is provided an optical transmitter including a tunable optical delay line configured to adjust a phase of an optical signal having a constant pulse period; an input coupler configured to distribute and output the phase-adjusted optical signal into optical signals of a plurality of channels; an optical modulator configured to optically modulate each of the distributed optical signals of the plurality of channels into a multilevel optical signal using an electrical signal; a fixed optical delay line configured to perform a preset time delay for each of the optical signals of the plurality of channels optically modulated into the multilevel optical signal; an output coupler configured to optically multiplex the optical signals of the plurality of channels for which the time delay has been performed into an OTDM signal; and an integrated circuit configured to match phases of the optical signal and the electrical signal input to the optical modulator by using a BER for a part of the optically multiplexed OTDM signal.

The integrated circuit may control the tunable optical delay line so that the BER is minimized to adjust the time delay of the optical signal, thereby matching the phases of the optical signal and the electrical signal input to the optical modulator.

In the fixed optical delay line, the value of the time delay of the optically modulated optical signal may be determined according to a modulation speed of the optical modulator and the number of channels of the OTDM signal.

The optical transmitter may further include an electrical delay line configured to perform a time delay for the electrical signal input to the optical modulator.

The value of the time delay for the electrical signal provided by the electrical delay line may be the same as the value of the time delay for the optically modulated optical signal provided by the fixed optical delay line.

According to an aspect, there is provided an optical transmitter including an input coupler configured to distribute and output an optical signal having a constant pulse period into optical signals of a plurality of channels; an optical power controller configured to control optical power intensity of each of the distributed optical signals of the plurality of channels; an optical modulator configured to optically modulate each of the optical signals of the plurality of channels output through the optical power controller into a multilevel optical signal using an electrical signal; a fixed optical delay line configured to perform a preset time delay for each of the optical signals of the plurality of channels optically modulated into the multilevel optical signal; an output coupler configured to optically multiplex the optical signals of the plurality of channels for which the time delay has been performed into an OTDM signal; and an integrated circuit configured to equalize optical power intensities of channels of the OTDM signal by using a BER of a part of the optically multiplexed OTDM signal.

The optical power controller may be an optical power attenuator or an optical power amplifier.

The integrated circuit may control the optical power controller so that the BER is minimized to adjust the optical power intensity of the optical signal, thereby equalizing the optical power intensities of the channels of the OTDM signal.

In the fixed optical delay line, the value of the time delay of the optically modulated optical signal may be determined according to a modulation speed of the optical modulator and the number of the channels of the OTDM signal.

The optical transmitter may further include an electrical delay line configured to perform a time delay for the electrical signal input to the optical modulator.

The value of the time delay for the electrical signal provided by the electrical delay line may be the same as the value of the time delay for the optically modulated optical signal provided by the fixed optical delay line.

According to another aspect, there is provided an optical transmitter including a tunable optical delay line configured to adjust a phase of an optical signal having a constant pulse period; a photonic integrated circuit (PIC) chip on which (i) an input coupler configured to distribute and output the phase-adjusted optical signal into optical signals of a plurality of channels, (ii) an optical power controller configured to control optical power intensity of each of the distributed optical signals of the plurality of channels, (iii) an optical modulator configured to optically modulate each of the optical signals of the plurality of channels of which the optical power intensity has been controlled into a multilevel optical signal using an electrical signal, (iv) a fixed optical delay line configured to perform a preset time delay for each of the optical signals of the plurality of channels optically modulated into the multilevel optical signal, and (v) an output coupler configured to optically multiplex the optical signals of the plurality of channels for which the time delay has been performed into an OTDM signal are integrated; and an integrated circuit configured to solve issues of time synchronization between the optical signal and the electrical signal input to the optical modulator and non-uniform optical power between channels of the OTDM signal by using a BER of a part of the optically multiplexed OTDM signal.

The fixed optical delay line integrated on the PIC chip may be formed of a helical silicon optical waveguide whose length is adjusted.

The PIC chip may further include an electrical delay line configured to perform a time delay for the electrical signal input to the optical modulator, and the electrical delay line may be formed of a metal electrode whose length is adjusted.

The tunable optical delay line may be formed of a plurality of micro ring resonators (MRRs) connected in series.

The micro ring resonators may be integrated on the PIC chip.

The integrated circuit may control the tunable optical delay line so that the BER is minimized to adjust the time delay of the optical signal, thereby matching the phases of the optical signal and the electrical signal input to the optical modulator.

The integrated circuit may control the optical power controller so that the BER is minimized to adjust the optical power intensity of the optical signal, thereby equalizing the optical power intensities of the channels of the OTDM signal.

Additional aspects of example embodiments will be set forth in part in the description which follows and, in part, will be apparent from the description, or may be learned by practice of the disclosure.

According to example embodiments, it is possible to provide a structure of an optical transmitter and a method that may solve the issues of the complex structure and operation of a multilevel-OTDM-based optical transmitter while using a multilevel signal modulation format and the OTDM technology that may increase the transmission rate of an optical transmitter with limited bandwidth.

More specifically, according to example embodiments, it is possible to provide a structure of an optical transmitter and a method that solve the issue of time synchronization between an optical signal and an electrical signal occurring in the multilevel-OTDM-based optical transmitter by using the BERBER for a part of an OTDM signal.

Further, according to example embodiments, it is possible to provide a structure of an optical transmitter and a method that solve the issue of non-uniform optical power between channels of the OTDM signal occurring in the multilevel-OTDM-based optical transmitter by using a BER for a part of an OTDM signal.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments of the invention will be described in detail with reference to the accompanying drawings.

Figure 1:
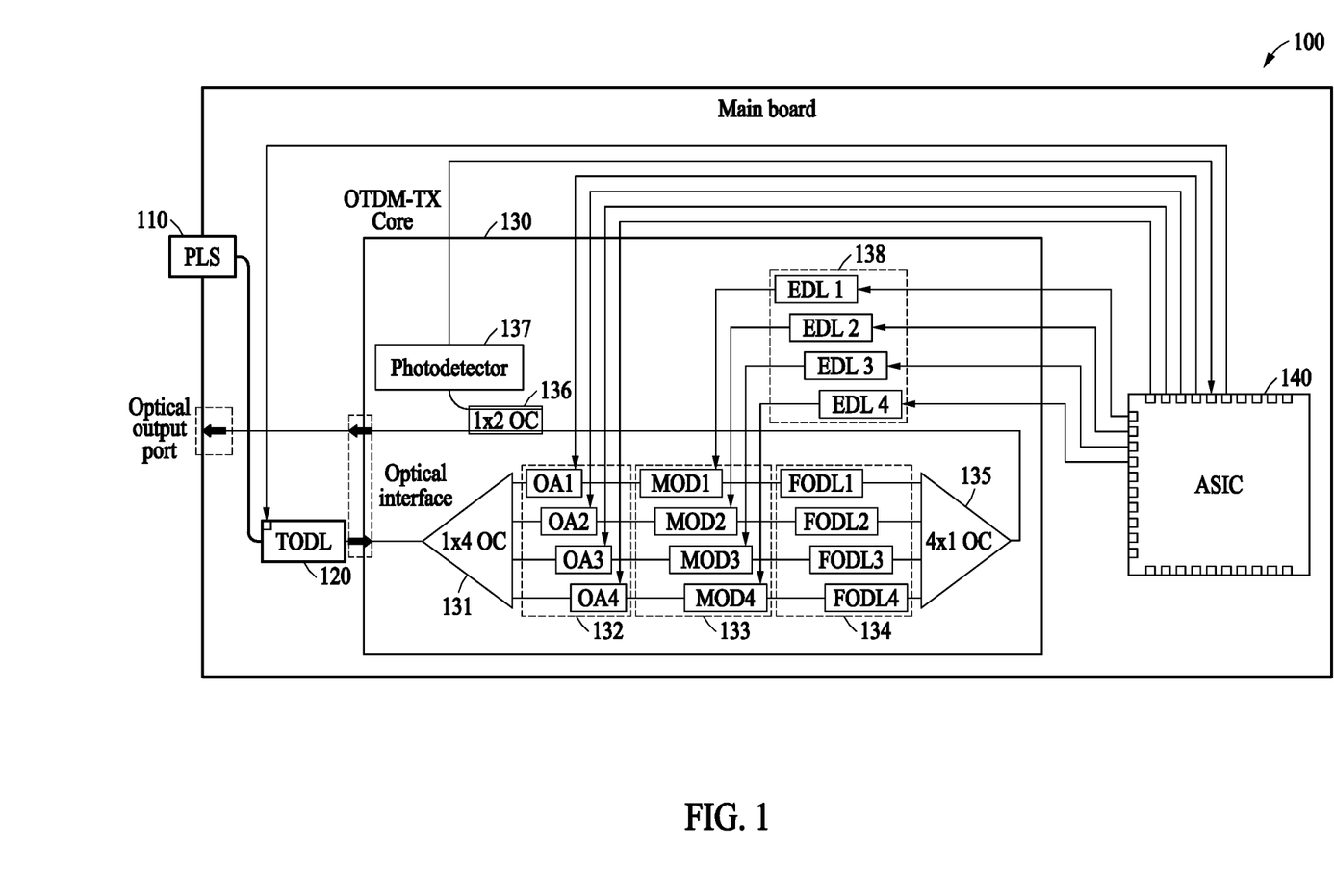
FIG. 1 is a diagram illustrating a structure of an optical transmitter according to a first example embodiment.

FIG. 1 is a diagram illustrating a structure of an optical transmitter according to a first example embodiment.

Referring to FIG. 1, an optical transmitter 100 according to the first example embodiment may have four optical time division multiplexing (OTDM) channels, but this is merely an example. The number of OTDM channels is not limited thereto, and the optical transmitter 100 may have a various number of OTDM channels.

Specifically, the optical transmitter 100 may include a pulsed light source (PLS) 110, a tunable optical delay line (TODL) 120, and an OTDM-based optical transmitter core (OTDM-TX Core) 130, and an integrated circuit 140 disposed on a main board. In this case, the integrated circuit 140 may be an application-specific integrated circuit (ASIC) chip, but this is merely an example. The integrated circuit 140 is not limited thereto and may be implemented as various types of chips.

First, the PLS 110 may output an optical signal in the form of an optical pulse train having a constant pulse period (Tp), and the output optical signal may be input to the OTDM-TX Core 130 through the TODL 120.

In this case, transmission capacity of an OTDM signal output through the OTDM-TX Core 130 may be determined as follows. First, it is assumed that a Baud-rate of each channel of an N-channel OTDM signal is B. In the case that each channel of the OTDM signal is modulated into a multilevel pulse amplitude modulation (PAM)-N signal with a relation of Tp=1/B, the data rate for each channel may be B×log 2N. Accordingly, the transmission capacity of the N-channel OTDM signal may be determined as N×B×log 2N.

An example of specific operations of the OTDM-TX Core 130 is as follows. The optical signal input via the TODL 120 may be distributed by an input coupler 131. For example, the OTDM-TX Core 130 providing the N-channel OTDM signal may be provided with a 1×N optical coupler to distribute the optical signal input via the TODL 120 into optical signals of N channels.

Each of the distributed optical signals of the N channels may be input to an optical modulator 133 via an optical power controller 132. The optical signals of the N channels optically modulated through the optical modulator 133 may be each time-delayed through a fixed optical delay line (FODL) 134 by time allotted (0×Ts, 1×Ts, 2×Ts, ..., (N−2)×Ts, (N−1)×Ts). In this case, the time delay value Ts may be determined as Ts=Tp/N in consideration of the number of channels (N) of the OTDM signal.

Thereafter, the time-delayed optical signals of the N channels may be optically multiplexed into an OTDM signal through an output coupler 135 in the form of an N×1 optical coupler, and may be output to an optical interface through an optical coupler 136. At this time, for effective OTDM signal generation, input pulse width (Tpw) of the PLS 110 should have a value of about Tpw to Ts (an approximate value). If the pulse width is too large, intersymbol interference (ISI) may occur, and if the pulse width is too small, a timing margin of one bit may be reduced, thereby degrading bit error rate (BER) performance.

Figure 2A:
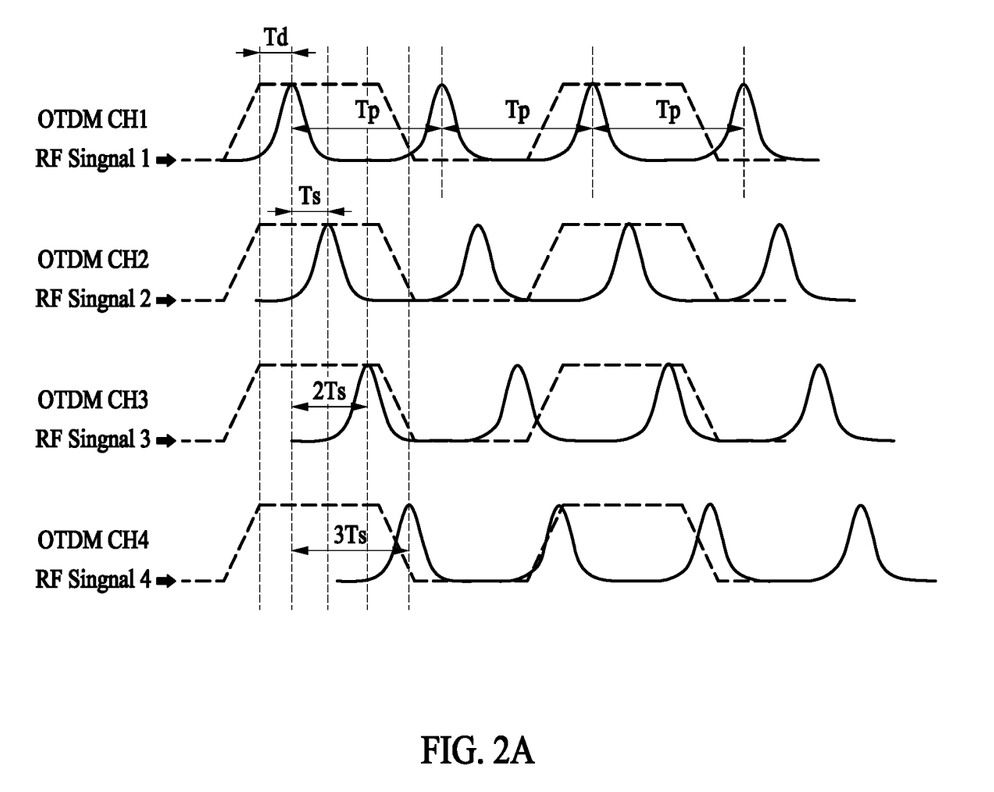
FIGS. 2A and 2B are diagrams illustrating examples of time allocation of optical time division multiplexing (OTDM) signals according to the first example embodiment.

For example, in the case of a 4-channel (N=4) OTDM-based optical transmitter 100 in which a 25-gigabaud (GBd) PAM-4 signal is modulated to provide a transmission rate of 200 Gb/s as shown in FIG. 2A, the pulse period Tp of the optical signal output through the PLS 110 is 40 picoseconds (ps), and the time delay value Ts by the FODL 134 is 10 ps.

Accordingly, for each of the optical signals of the N channels input to the FODL 134, a time delay of 10 ps for FODL2, 20 ps for FODL3, and 30 ps for FODL4 may be set based on FODL1. The time delay values Ts may be determined and fixed according to the modulation speed of the optical modulator 133 and the number of channels of the OTDM signal. Therefore, FODL1, FODL2, FODL3, and FODL4 included in the FODL 134 may be implemented by passive elements requiring no power and having fixed time delays.

For effective OTDM signal generation of the 4-channel OTDM-based optical transmitter 100, the input pulse width Tpw of the PLS 110 should have an approximate value of Ts=10 ps or less, and it is assumed that the OTDM-TX Core 130 has no inter-channel time delay of the OTDM signal for the remaining parts except for the FODL 134.

Even if the time delay between the optical signals of the N channels is allocated using the FODL 134, the phases of the optical signal input to the optical modulator 133 and a high-speed RF electrical signal should be matched. It is very important to implement phase matching in an uncomplicated and cost-effective manner.

For example, FIG. 2A shows that a pulsed optical signal input to the optical modulator 133 and the high-speed RF electrical signal are out of phase (Td≠0). In this case, it is assumed that transmission lines of all high-speed RF electrical signals are well designed and there is no skew between the channels. As shown in FIG. 2A, in the case that the optical signal and the high-speed RF electrical signal area out of phase by the time Td, optical modulation is properly performed for OTDM channels 1 to 3, but for OTDM channel 4, modulation is performed in opposite phases due to phase mismatch, resulting in a bit error.

Figure 2B:
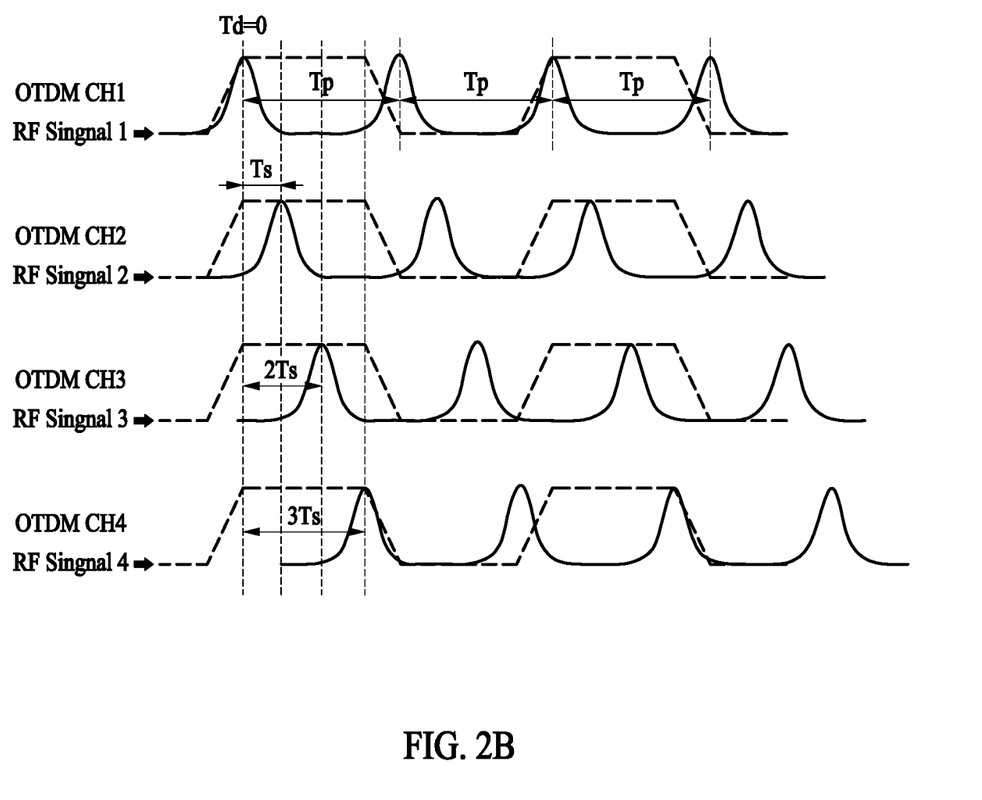

On the other hand, FIG. 2B shows that a pulsed optical signal input to the optical modulator 133 and a high-speed RF electrical signal are in phase (Td=0). In order to match the phases of the pulsed optical signal input to the optical modulator 133 and the high-speed RF electrical signal as described above, the optical transmitter 100 may include the TODL 120 whose time delay is adjusted by an electrical signal at the input terminal of the OTDM-TX Core 130.

For this operation, the OTDM-TX Core 130 may further include the optical coupler 136 and a photodetector 137. More specifically, the OTDM signal output through the output coupler 135 may be partially tapped by the optical coupler 136 (for example, a 1×2 optical coupler) and input to the photodetector 137, then converted into an electrical signal and output to be transmitted to the integrated circuit 140 (for example, the ASIC chip).

Then, the integrated circuit 140 may sweep the time delay of the TODL 120 while counting the BER of the electrical signal received from the photodetector 137. At this time, the Td value changes according to the swept time delay of the TODL 120, and the integrated circuit 140 may match phases of the pulsed optical signal input to the optical modulator 133 and the high-speed RF electrical signal by controlling the TODL 120 so that the BER is minimized to adjust the time delay of the optical signal in the form of an optical pulse train output from the PLS 110.

As such, the optical transmitter 100 proposed in the present disclosure may solve the time synchronization issue for OTDM by simply adding one TODL 120, the optical coupler 136, and the photodetector 137 and utilizing the BER counting function of the ASIC chip.

However, the OTDM-based optical transmitter 100 proposed in the present disclosure is not limited to the method of optimally setting the time delay of the TODL 120 only with the BER counting function of the ASIC chip, and the time delay may be optimally set using performance indices other than the BER, such as the optical power and an eye diagram waveform of the optical signal. For example, the OTDM-based optical transmitter 100 may set an expected eye diagram (eye mask) waveform and the optical power for the eye diagram in the ASIC chip in advance and compare a measured eye diagram waveform and the eye diagram waveform previously set in the ASIC chip to determine whether or not the optical signal is normally modulated. In this case, the OTDM-based optical transmitter 100 may optimally set the time delay of the TODL 120 through a sweep if the measured eye diagram waveform is not in the ASIC chip.

The input coupler 131, the optical modulator 133, the FODL 134, and the output coupler 135 included in the OTDM-TX Core 130 may have different insertion losses depending on the OTDM channel. In an optical communication system and module using a multilevel modulation format, a difference in the insertion loss between the OTDM channels may cause the issue of increasing the BER.

Figure 3A:
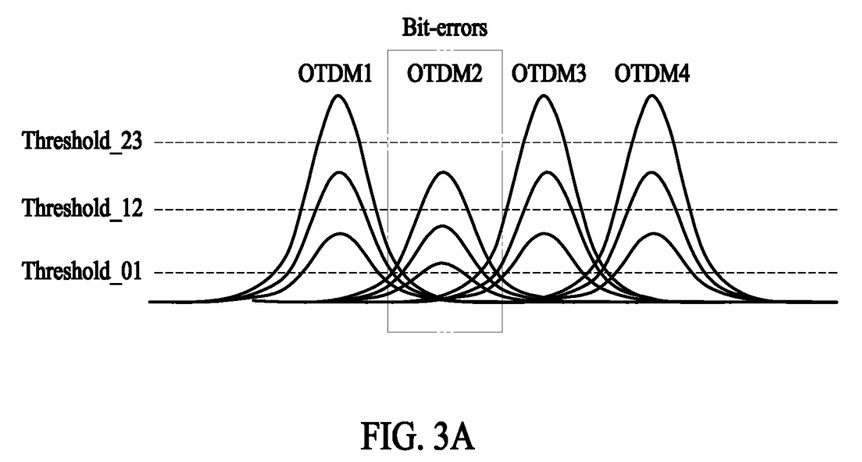
FIGS. 3A and 3B are diagrams illustrating threshold level setting of pulse amplitude modulation (PAM)-4 OTDM signals according to the first example embodiment.

FIG. 3A shows an example in which OTDM Channel 2 to which the multilevel modulation format of PAM-4 is applied has a larger insertion loss than other channels. Threshold levels between the <00>level (0 level) and the <01>level (1 level), between the <01>level (1 level) and the <10>level (2 level), and between the <10>level (2 level) and the <11>level (3 level) of a PAM-4 signal are denoted by Threshold_01, Threshold_12, and Threshold_23, respectively.

While no bit errors occur in OTDM Channel 1, OTDM Channel 3, and OTDM Channel 4, a significant bit error occurs in OTDM Channel 2 because the set threshold level deviates from the signal level. Therefore, the BER should be improved by uniformly matching the power of all OTDM channels.

For this operation, the OTDM-TX Core 130 may further include the optical power controller 132 for controlling the optical power intensity of each of the optical signals of the plurality of OTDM channels. More specifically, the OTDM signal output through the output coupler 135 may be partially tapped by the optical coupler 136 and input to the photodetector 137, and then converted into an electrical signal and output to be transmitted to the integrated circuit 140.

Then, the integrated circuit 140 may sweep an attenuation factor or an amplification factor of the optical power controller 132 while counting the BER of the electrical signal received from the photodetector 137. More specifically, the integrated circuit 140 may include a sweep algorithm for the attenuation factor or the amplification factor. For example, in the case that the BER performance is improved by amplifying the optical power of about 10% for a specific channel, the integrated circuit 140 may continuously amplify the optical power and then attenuate the optical power when the BER performance deteriorates again to set the optimized amplification/attenuation factor.

Figure 3B:
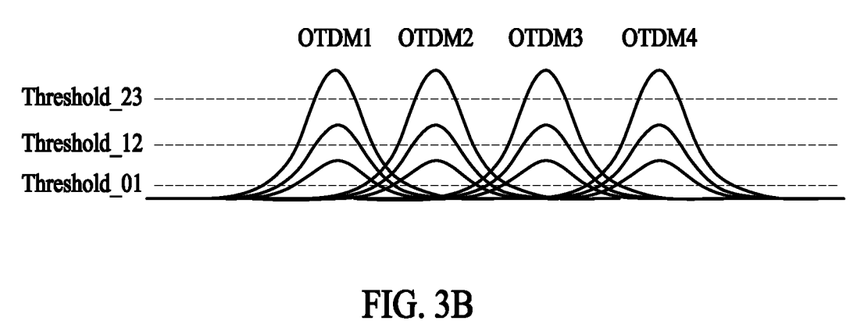

The integrated circuit 140 may control the optical power controller 132 so that the BER is minimized to find the optimized attenuation or amplification factor, thereby equalizing the optical power intensities of all OTDM channels as shown in FIG. 3B. Accordingly, the optical power controller 132 may include an optical power attenuator or an optical power amplifier.

Figure 4:
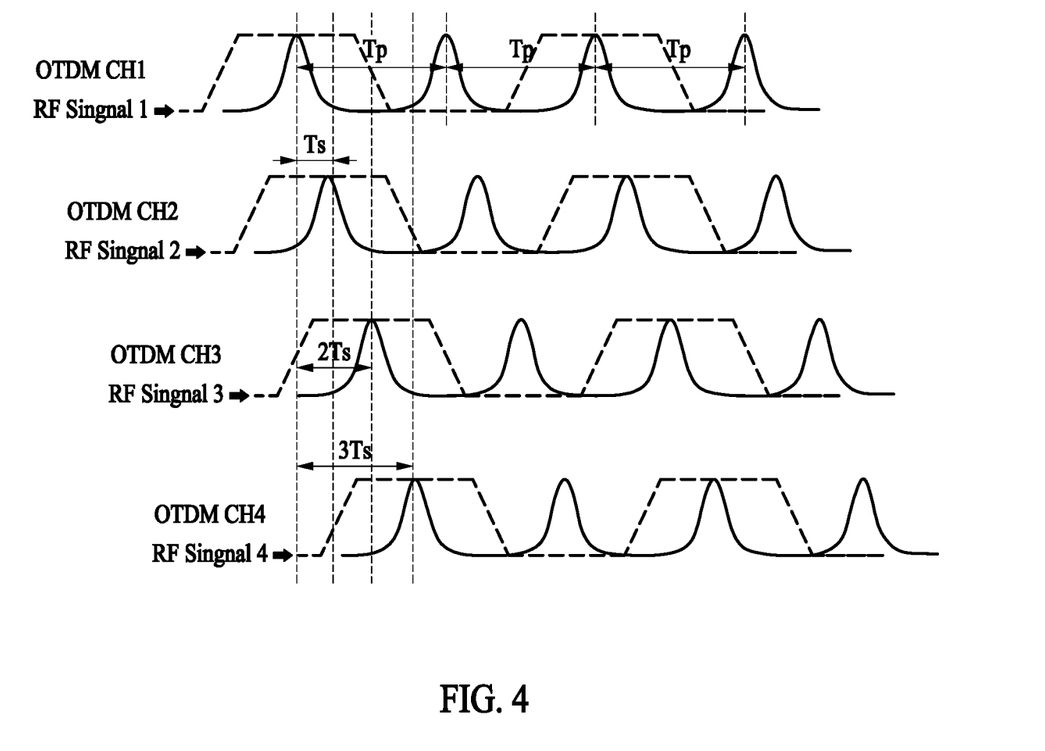
FIG. 4 is a diagram illustrating an example of maximizing optical modulation performance through an electrical delay line according to the first example embodiment.

The OTDM-based optical transmitter 100 proposed in the present disclosure may further include an electrical delay line 138 as shown in FIG. 4 to further improve modulation performance. Typically, when a pulsed optical signal is positioned at the bit center of the high-speed RF electrical signal input to the optical modulator 133, the optical modulation performance may be maximized.

Therefore, the OTDM-based optical transmitter 100 may introduce time delays among the electrical signals RF Signal1, RF Signal2, RF Signal3 and RF Signal4 by adding the electrical delay line 138 to the OTDM-TX Core 130. In this case, EDL1 to EDL4 included in the electrical delay line 138 may be designed to have fixed or tunable time delays.

In the case that the electrical delay line 138 is implemented on a PIC chip, EDL1 to EDL4 may be designed to have fixed time delay values. In this case, the time delay values of EDL1 to EDL4 may be designed to match the time delay values of FODL1 to FODL4, respectively. Here, the propagation time of the pulsed optical signal is affected by the group velocity of an optical waveguide, and the high-speed RF electrical signal is affected by the phase velocity of a metal transmission line. Therefore, in the case of setting the time delay values of EDL1 to EDL4 to match the time delay values of FODL1 to FODL4, the refractive index should be considered carefully.

On the other hand, in the case that the electrical delay line 138 is not implemented on the PIC chip, EDL1 to EDL4 may be designed to have tunable time delay values.

Figure 5:
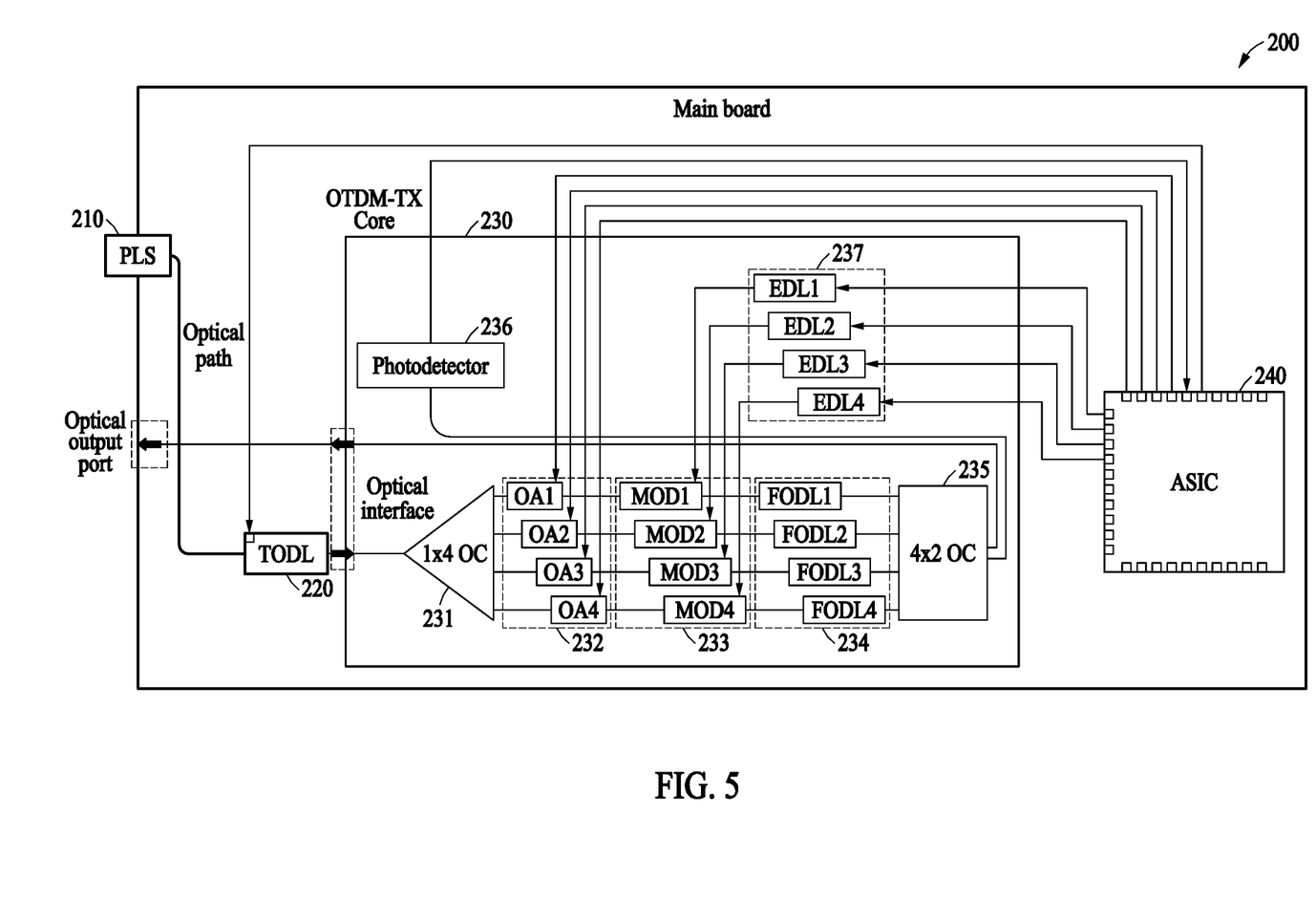
FIG. 5 is a diagram illustrating a structure of an optical transmitter according to a second example embodiment.

FIG. 5 is a diagram illustrating a structure of an optical transmitter according to a second example embodiment.

In the optical transmitter 100 according to the first example embodiment, the optical signals of the N channels may be optically coupled into the OTDM signal through the output coupler 135 in the form of the N×1 optical coupler in the OTDM-TX Core 130. At this time, the optical signals of the N channels optically coupled into the OTDM signal have optical power reduced to about 1/N while passing through the N×1 optical coupler.

For example, in the case of a 4-channel OTDM with N=4 as in the first example embodiment, each of optical signals of N channels has optical power reduced by 6 dB when passing the output coupler 135, which is the 4×1 optical coupler. In addition, for time synchronization and optical power intensity uniformity, a part of the OTDM signal should be tapped through the 1×2 type optical coupler 136 and input to the photodetector 137. Therefore, the output optical power of an optical output port of the OTDM-TX Core 130 decreases again.

If the output of the 4×1 coupler is 1 mW and is tapped by the 1×2 optical coupler which is a 50:50 optical coupler, each of the outputs of the 1×2 optical coupler may be 0.5 mW.

In order to prevent this issue, an optical transmitter 200 according to the second example embodiment may input the optical power to a photodetector 236 without additional tapping of the OTDM signal by using an M×2 optical coupler instead of an M×1 optical coupler as an output coupler 235, as shown in FIG. 5. In other words, each of the two outputs of the 4×2 optical coupler is 1 mW like the output of the 4×1 coupler and is input to the photodetector 236 without additional tapping, and thus, the issue of reduced optical power may be solved.

Figure 6:
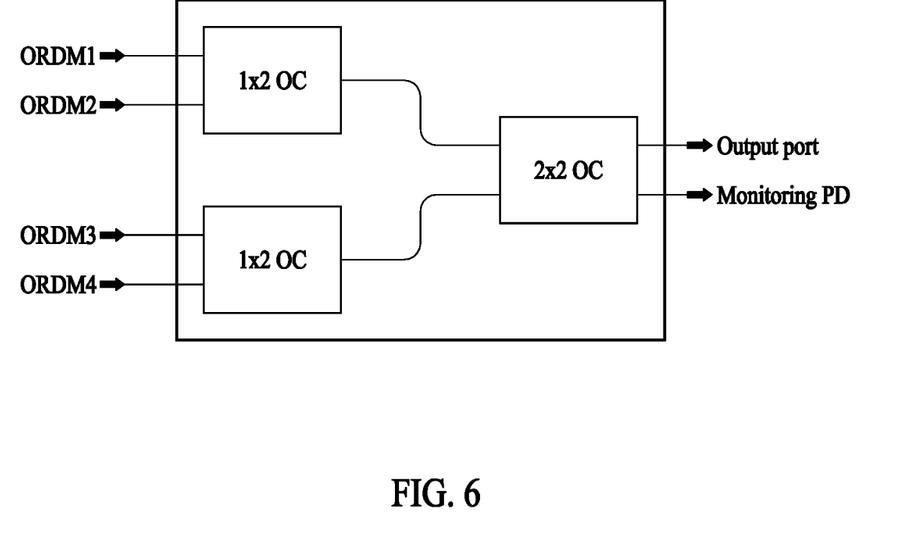
FIG. 6 is a diagram illustrating a structure of an output coupler according to the second example embodiment.

In the case of the 4-channel OTDM, the 4×2 optical coupler of the optical transmitter 200 may be configured by connecting two 1×2 optical couplers and one 2×2 optical coupler in two stages as shown in FIG. 6. Alternatively, the optical transmitter 200 may use an integrated 4×2 optical coupler.

In addition, a PLS 210, a TODL 220, an OTDM-TX Core 230, and an integrated circuit 240 included in the optical transmitter 200 may perform the same functions as the PLS 110, the TODL 120, the OTDM-TX Core 130, and the integrated circuit 140 included in the optical transmitter 100.

Figure 7:
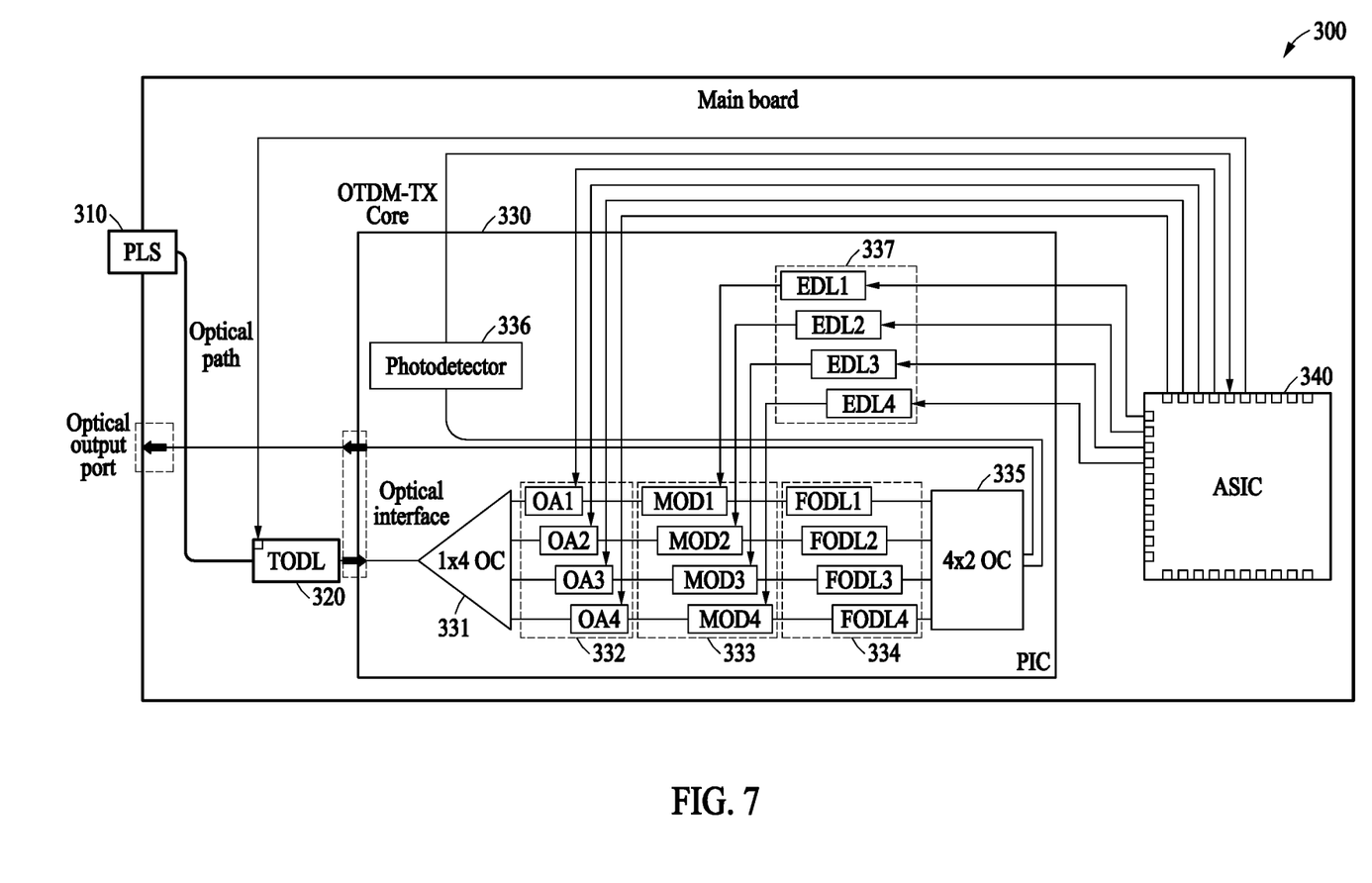
FIG. 7 is a diagram illustrating a structure of an optical transmitter according to a third example embodiment.

FIG. 7 is a diagram illustrating a structure of an optical transmitter according to a third example embodiment.

An optical transmitter 300 according to the third example embodiment may integrate several bulky optical elements into one chip by using the photonic integrated circuit (PIC) technology. In the case that the OTDM-based optical transmitter 300 is integrated using the PIC technology, many issues (size, time synchronization, optical power uniformity between OTDM channels) that have been an obstacle to commercialization may be alleviated. In addition, if the PIC technology based on silicon photonics (SiPh), which has recently been spotlighted, is used, it may be more advantageous for commercialization because the existing CMOS process may be used.

An optically integrated OTDM-TX Core 330 provided in FIG. 7 may be implemented by a PIC or SiPh-based PIC chip on which an input coupler 331, an optical power controller 332, an optical modulator 333, a FODL 334, an output coupler 335, a photodetector 336, and an electrical delay line 337 are integrated.

For example, in the case that the OTDM-TX Core 330 is implemented with the SiPh-based PIC chip, the input coupler 331 and the output coupler 335 may be implemented as directional couplers or multimode interference couplers.

Further, in the case that the optical power controller 332 is an optical power attenuator, it may be implemented as a P-N doped optical waveguide, a PN junction optical waveguide, or a Mach-Zehnder interferometer. In this case, the Mach-Zehnder interferometer may include a phase shifter whose optical characteristics change according to an electrical signal or heat. On the other hand, in the case that the optical power controller 332 is an optical power amplifier, it may be implemented as a III-V gain medium-based semiconductor optical amplifier (SOA), for example.

In addition, the optical modulator 333 may be implemented as an electro-absorption modulator (EAM), a Mach-Zehnder modulator (MZM), a micro ring modulator (MRM), and the like.

The FODL 334 may be implemented as a helical silicon optical waveguide by adjusting the length of a silicon optical waveguide, and the electrical delay line 337 may be implemented by adjusting the length of a metal electrode. The photodetector 336 may be implemented as a germanium-based photodetector.

As described above, since the optical elements of the OTDM-TX Core 330 may be integrated into one chip, the optical transmitter 300 may be significantly improved in terms of complexity, power consumption, and cost. In addition, the OTDM-based optical transmitter 300 that is commercially available may be implemented by integrating additional optical elements together to solve the issues (time synchronization, optical power uniformity between OTDM channels) of the existing OTDM technology to be solved by the present disclosure. The optical output of the integrated OTDM-TX Core 330 may be coupled to the outside through an optical interface as shown in FIG. 7.

Figure 8:
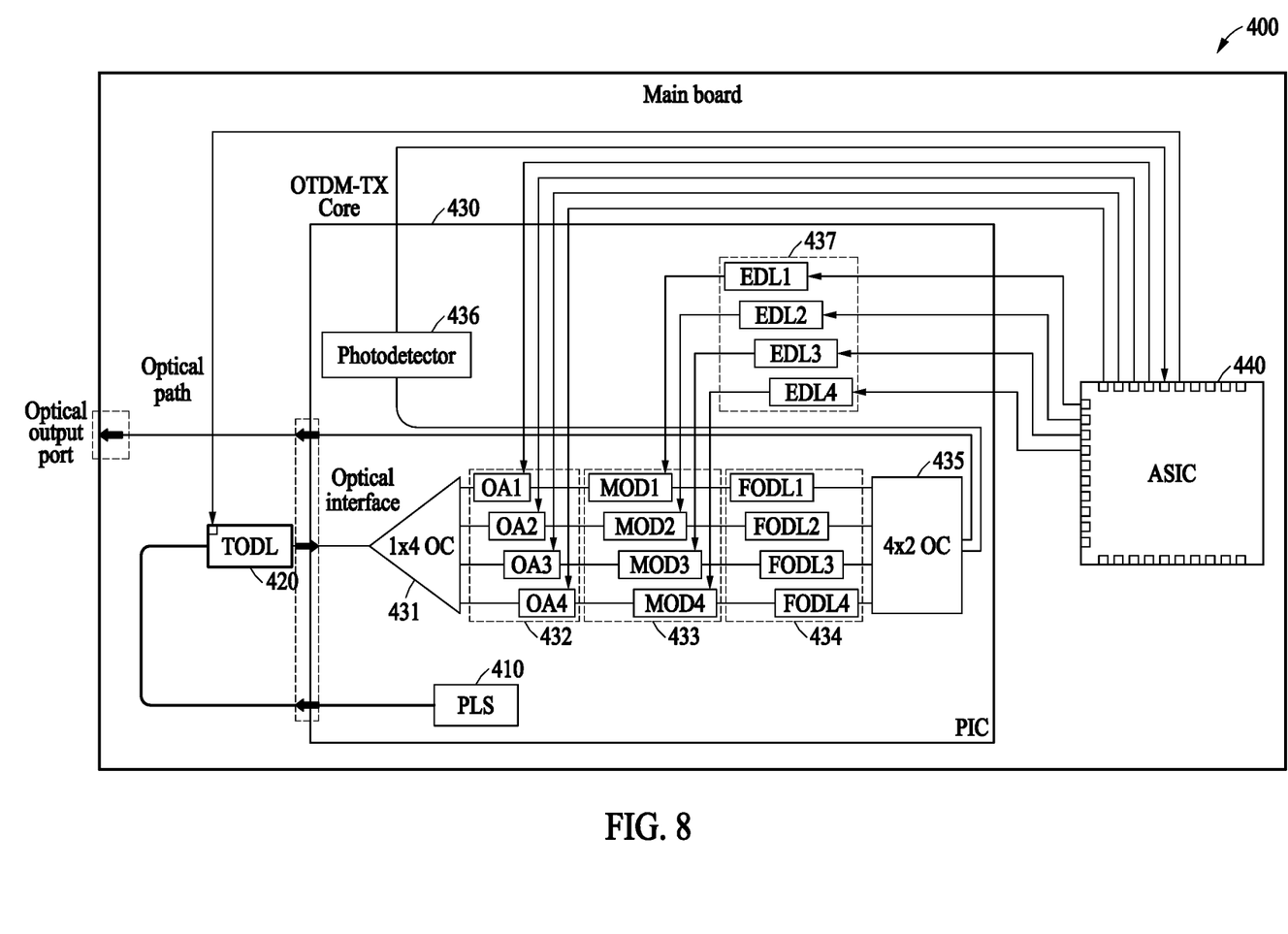
FIG. 8 is a diagram illustrating a structure of an optical transmitter according to a fourth example embodiment.

FIG. 8 is a diagram illustrating a structure of an optical transmitter according to a fourth example embodiment.

In an optical transmitter 400 according to the fourth example embodiment, a PLS 410 is integrated inside an OTDM-TX Core 430 in which optical elements are integrated on a PIC or SiPh-based PIC chip. In this case, the PLS 410 integrated on the SiPh-based PIC chip may be a III-V-on-Si mode locked laser in which a III-V gain medium is bonded on a silicon chip, for example. The type of the PLS 410 is merely one example and is not limited thereto, and various types of PLSs installable on the SiPh-based PIC chip may be integrated.

Figure 9:
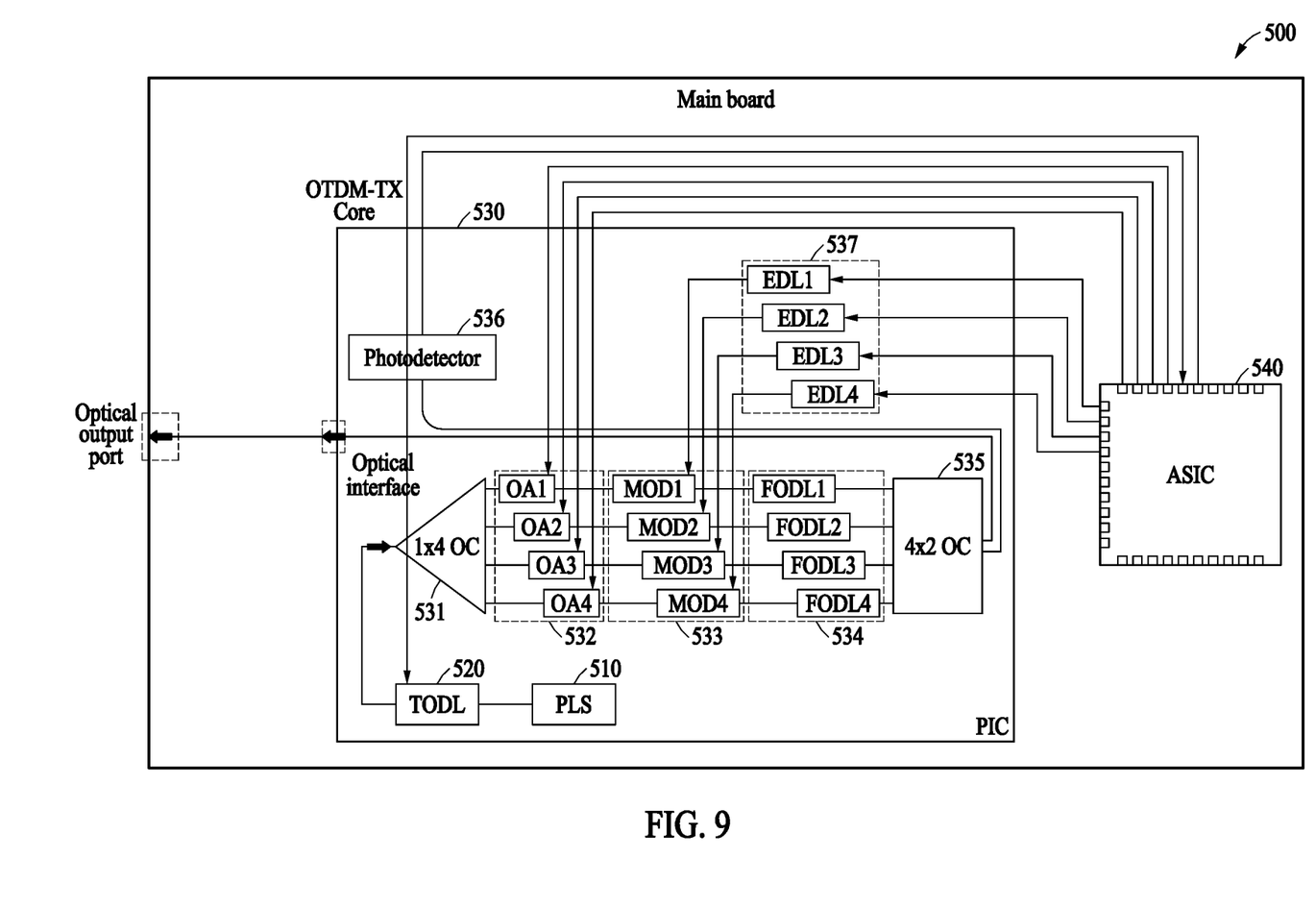
FIG. 9 is a diagram illustrating a structure of an optical transmitter according to a fifth example embodiment.

FIG. 9 is a diagram illustrating a structure of an optical transmitter according to a fifth example embodiment.

In an optical transmitter 500 according to the fifth example embodiment, a TODL 520 may be integrated in a PIC chip together with a PLS 510. In this case, the TODL 520 integrated on a SiPh-based PIC chip may be implemented as a structure of a plurality of cascaded silicon micro ring resonators (MRRs), for example.

In this case, the TODL 520 may adjust a time delay while turning each MRR on or off. For example, in the case that the TODL 520 is implemented with six MRRs as shown in FIG. 10, the time delay may be varied up to 6×Tr when a time delay of Tr per one MRR is possible.

More specifically, in the case that the input wavelength λin of an optical signal input to the TODL 520 matches a resonance wavelength λres of the MRR, the optical signal may be optically coupled to the MRR and output to an optical output port after resonance. In this case, the TODL 520 may adjust the MRR with an electrical signal to match or mismatch the resonance wavelength with the input wavelength.

Figure 10:
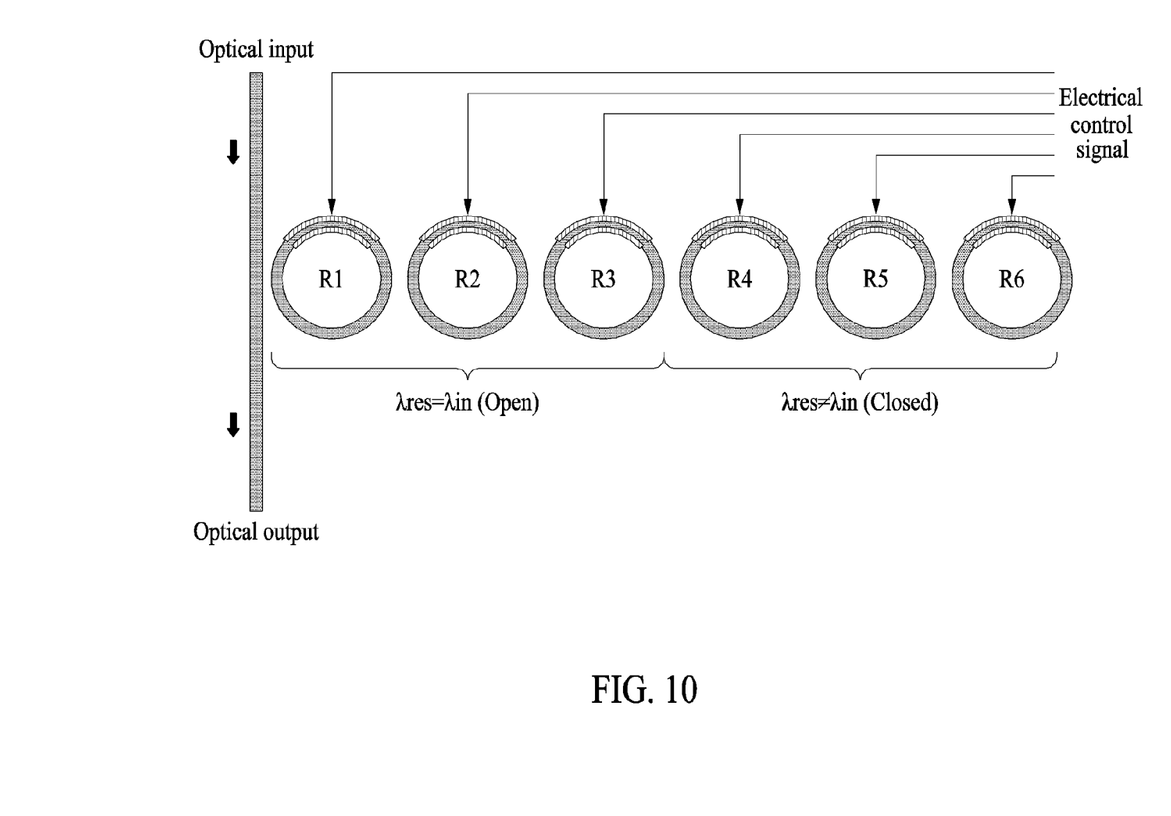
FIG. 10 is a diagram illustrating a structure of a tunable optical delay line according to the fifth example embodiment.

The TODL 520 provided in FIG. 10 shows a case in which three MRRs have a time delay of 3×Tr for λres=λin. As described above, in the OTDM-based optical transmitter 500 of the present disclosure, the TODL 520 may be mounted together on the SiPh-based PIC chip. In this case, the TODL 520 may include a plurality of MRRs connected in series, as well as various types of TODLs that are installable on the SiPh-based PIC chip.

Figure 11:
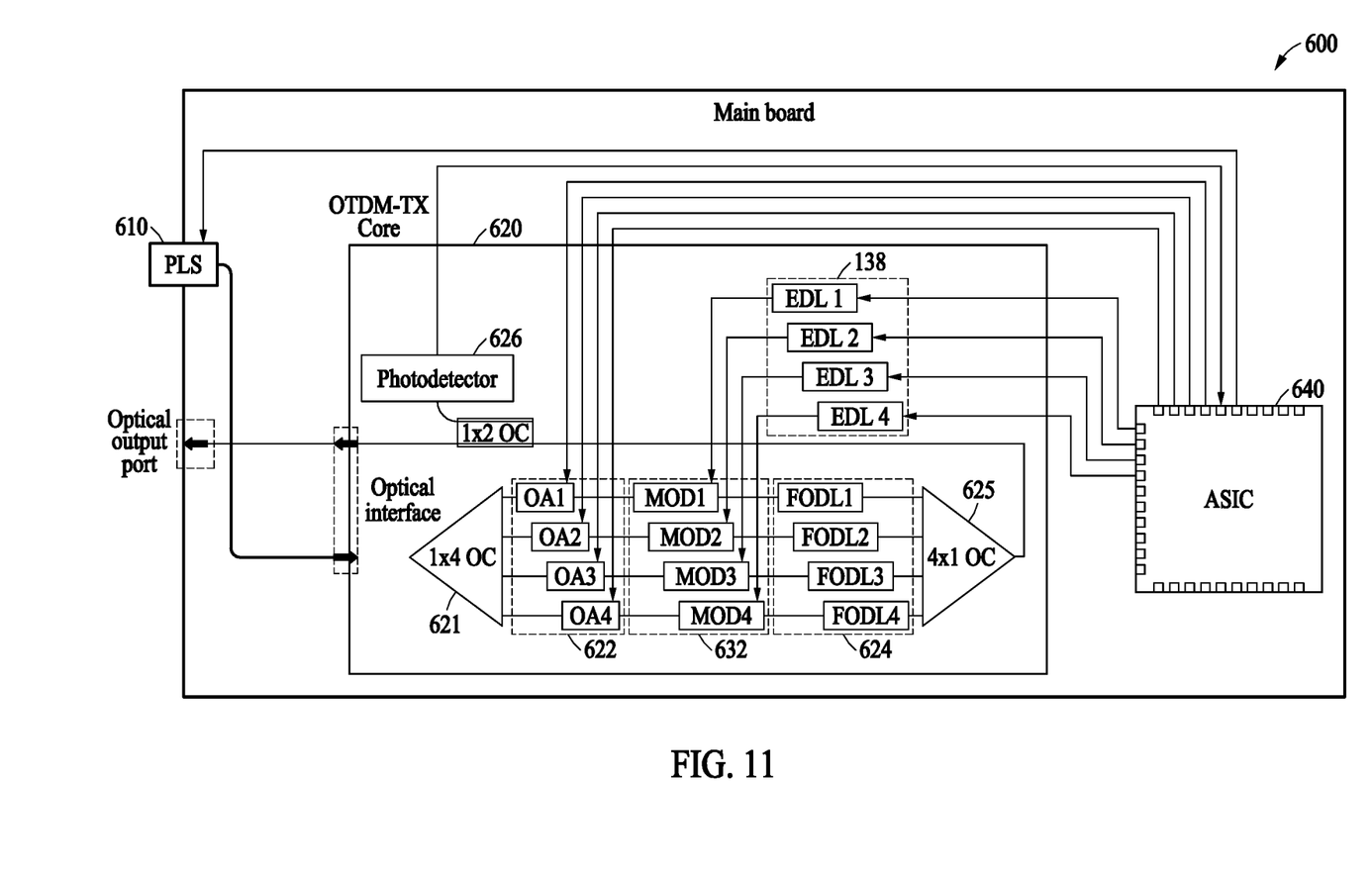
FIG. 11 is a diagram illustrating a structure of an optical transmitter according to a sixth example embodiment.

FIG. 11 is a diagram illustrating a structure of an optical transmitter according to a sixth example embodiment.

Referring to FIG. 11, an optical transmitter 600 according to the sixth example embodiment may include a PLS 610, an OTDM-TX Core 620, and an integrated circuit 630 disposed on a main board. In this case, the integrated circuit 630 may be an ASIC chip, but this is merely an example. The integrated circuit 630 is not limited thereto and may be implemented as various types of chips.

Here, the optical transmitter 600 according to the sixth example embodiment may include no TODL unlike the previous example embodiments.

More specifically, the PLS 610 may generate an optical pulse signal by a signal transmitted from the integrated circuit 630, which is the ASIC chip. In this case, the PLS 610 may be a Q-switching laser capable of converting an electrical signal of a wide time line width coming from the outside into a signal with a very narrow optical pulse.

Here, the integrated circuit 630 of the optical transmitter 600 may adjust a time delay of an electrical signal transmitted to the PLS 610 while counting the BER for an electrical signal received from a photodetector 627. In other words, the optical transmitter 600 may replace the role of the TODLs provided in other example embodiments by adjusting the time delay of the electrical signal output from the integrated circuit 630.

In the case that the OTDM-TX Core 620 is a PIC chip, the PLS 610 may be included in the PIC chip, but alternatively may be disposed outside the PIC chip due to power consumption or heat generation issues.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An optical transmitter comprising:
   a tunable optical delay line configured to adjust a phase of an optical signal having a constant pulse period;
   a photonic integrated circuit (PIC) chip on which (i) an input coupler configured to distribute and output the phase-adjusted optical signal into optical signals of a plurality of channels, (ii) an optical power controller configured to control optical power intensity of each of the distributed optical signals of the plurality of channels, (iii) an optical modulator configured to optically modulate each of the optical signals of the plurality of channels of which the optical power intensity has been controlled into a multilevel optical signal using an electrical signal, (iv) a fixed optical delay line configured to perform a preset time delay for each of the optical signals of the plurality of channels optically modulated into the multilevel optical signal, and (v) an output coupler configured to optically multiplex the optical signals of the plurality of channels for which the time delay has been performed into an optical time division multiplexing (OTDM) signal are intergrated; and
   an intergrated circuit configured to solve issues of time synchronization between the optical signal and the electrical signal input to the optical modulator and non-uniform optical power between channels of the OTDM signal by using a bit error rate (BER) of a part of the optically multiplexed OTDM signal.

2. The optical transmitter of claim 1, wherein the fixed optical delay line integrated on the PIC chip is formed of a helical silicon optical waveguide whose length is adjusted.

3. The optical transmitter of claim 1, wherein
   the PIC chip further comprises an electrical delay line configured to perform a time delay for the electrical signal input to the optical modulator, and
   the electrical delay line is formed of a metal electrode whose length is adjusted.

4. The optical transmitter of claim 1, wherein the tunable optical delay line is formed of a plurality of micro ring resonators (MRRs) connected in series.

5. The optical transmitter of claim 4, wherein the micro ring resonators are integrated on the PIC chip.

6. The optical transmitter of claim 1, wherein the integrated circuit controls the tunable optical delay line so that the BER is minimized to adjust the time delay of the optical signal, thereby matching phases of the optical signal and the electrical signal input to the optical modulator.

7. The optical transmitter of claim 1, wherein the integrated circuit controls the optical power controller so that the BER is minimized to adjust the optical power intensity of the optical signal, thereby equalizing the optical power intensities of the channels of the OTDM signal.

* * * * *